United States Patent
Scelsi et al.

(10) Patent No.: US 7,488,044 B2
(45) Date of Patent: Feb. 10, 2009

(54) BEAM KEY AND WHEEL ASSEMBLY INCLUDING SAME

(75) Inventors: Anthony Scelsi, Elkhart, IN (US); Delbert K. Patterson, Eau Claire, MI (US); Bradley E. Fish, Elkhart, IN (US)

(73) Assignee: Honeywell International Inc., Morristown, NJ (US)

( * ) Notice: Subject to any disclaimer, the term of this patent is extended or adjusted under 35 U.S.C. 154(b) by 64 days.

(21) Appl. No.: 11/409,954

(22) Filed: Apr. 25, 2006

(65) Prior Publication Data
US 2007/0246995 A1 Oct. 25, 2007

(51) Int. Cl.
*B60B 19/00* (2006.01)
*F16D 55/36* (2006.01)

(52) U.S. Cl. .................. 301/6.2; 188/71.5; 301/6.91

(58) Field of Classification Search .............. 301/6.1, 301/6.2, 6.91; 188/71.5, 71.6; 411/537, 411/538; 403/316, 317, 318, 319
See application file for complete search history.

(56) References Cited

U.S. PATENT DOCUMENTS

| | | | |
|---|---|---|---|
| 2,990,216 A | 6/1961 | Albright et al. | |
| 2,998,282 A | 8/1961 | Moyer | |
| 3,201,174 A | 8/1965 | Stanton | |
| 3,958,833 A | 5/1976 | Stanton | |
| 4,585,096 A * | 4/1986 | Bok | 188/73.37 |
| 5,024,297 A * | 6/1991 | Russell | 188/18 A |
| 5,199,536 A * | 4/1993 | Clark | 188/264 G |
| 5,931,269 A * | 8/1999 | Detwiler et al. | 188/382 |
| 6,003,954 A | 12/1999 | Everhard et al. | |
| 7,093,697 B2 * | 8/2006 | Thorp et al. | 188/71.6 |

* cited by examiner

*Primary Examiner*—Russell D Stormer
*Assistant Examiner*—Kip T Kotter
(74) *Attorney, Agent, or Firm*—Birch, Stewart, Kolasch & Birch, LLP

(57) ABSTRACT

An aircraft wheel assembly includes a wheel (12) and a beam key (40) mounted on the wheel (12). The beam key (40) includes a body (46) having first and second longitudinally spaced ends (42, 44), an upper side (48), and a lower side (52) having a first surface (53), and a bore (60) having a first end opening (66) in the first surface and a second end opening (64). The wheel (12) includes a centerline (20), an opening (18) for receiving the body first end (42), a second surface (26) angled with respect to the centerline (20), and a wheel bore (30) coaxially aligned with the beam key bore (60) when the body first end (42) is received in the opening (18), the wheel bore (30) having a first end opening in the second surface (28). A spacer (70) must be included between the beam key (40) and the wheel (12).

15 Claims, 6 Drawing Sheets

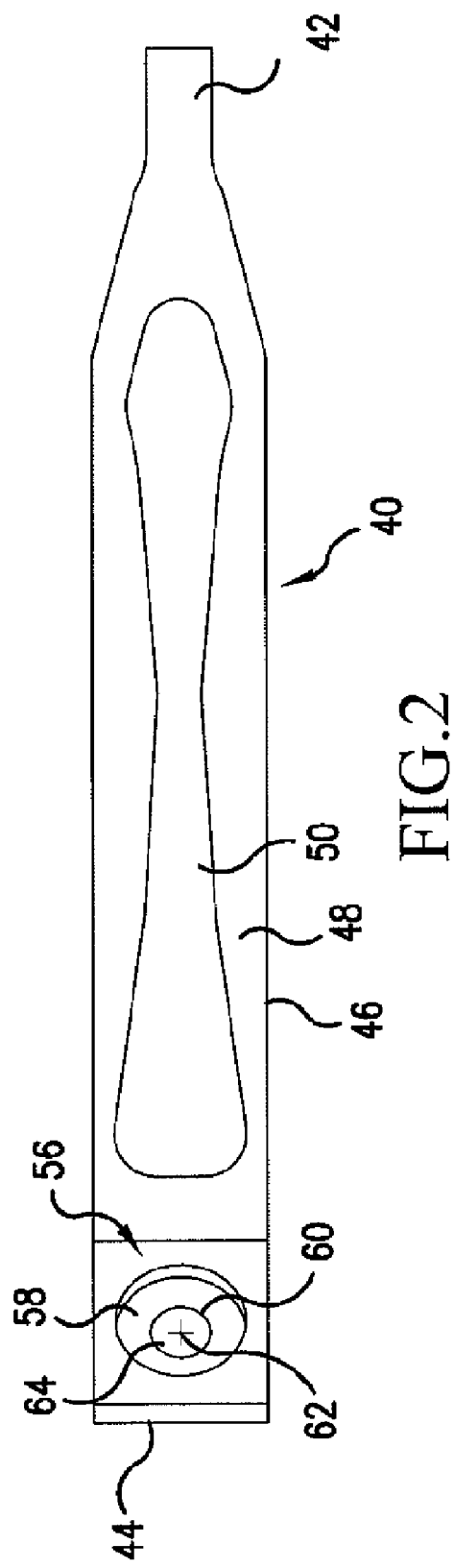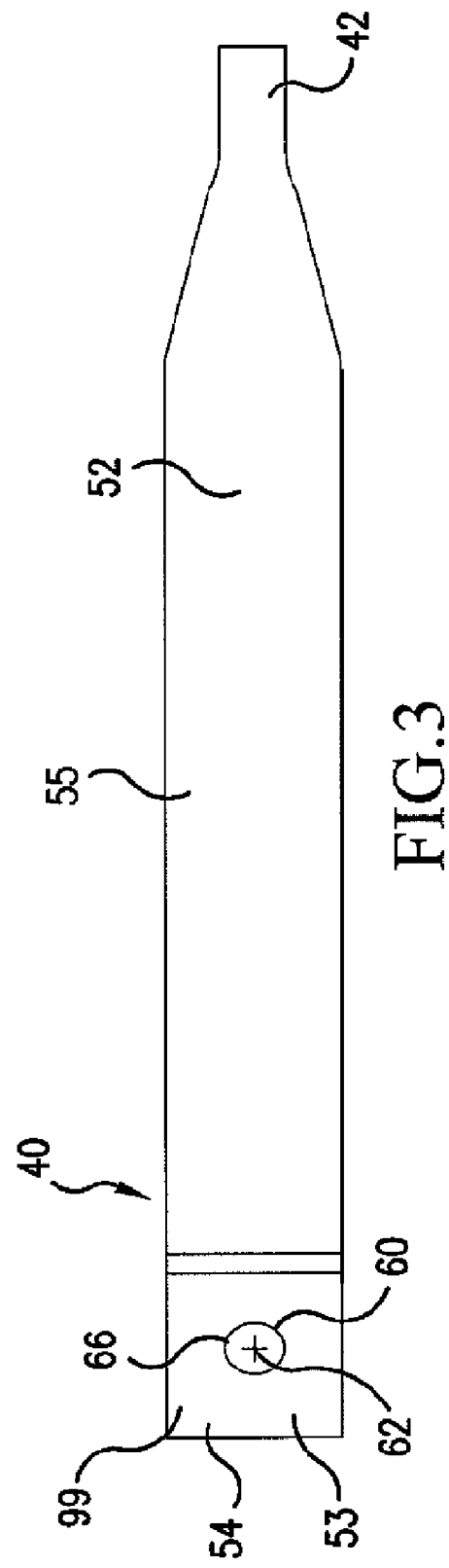

BEAM KEY AND WHEEL ASSEMBLY INCLUDING SAME

FIELD OF THE INVENTION

The present invention is directed to a beam key and an installation arrangement including a beam key and a portion of a wheel, and, more specifically, toward a beam key having a mounting surface and a wheel portion having a mounting surface angled with respect to an axis of the wheel to which the beam key is attached.

BACKGROUND OF THE INVENTION

Braking systems, such as those found on many aircraft, include a plurality of rotors mounted on a wheel. These rotors extend between a plurality of stators mounted on a fixed portion of a brake torque tube. Together the rotors and stators may be referred to as a brake stack or disk stack. To slow the rotation of the wheel, an actuator is used to compress the disk stack and produce friction between the rotors and stators.

The rotors in the disk stack may be connected to the wheel using beam keys mounted on the wheel. A beam key or drive key supporting a plurality of rotors is disclosed, for example, in U.S. Pat. No. 3,958,833 to Stanton, the contents of which is hereby incorporated by reference.

Known beam keys generally include a tang at a first end that is received in an opening parallel to the axis of rotation of the wheel being braked and a second end that is connected to an outer portion of the wheel. The outer end may be connected to the wheel by a fastener such as a bolt that is perpendicular to the wheel's axis of rotation or by a fastener that is angled with respect to the wheel's axis of rotation. A spacer or foot may also be included between the beam key and the wheel when a bolt perpendicular to the wheel's axis of rotation is used.

The use of a fastener angled with respect to the wheel's axis of rotation advantageously allows for a shorter, and thus lighter weight, beam key to be employed. A benefit of a shorter key is increased clearance with the brake assembly. FIG. 9 schematically illustrates an example of a beam key 200 mounted on a wheel 202 and arranged to receive a fastener. In this example, wheel 202 includes a bore 204 near a rim 206, bore 204 having a centerline 203 angled with respect to the circumferential inner surface 205 of wheel 202. Beam key 200 includes a boss 208 projecting from a lower side 210 of the key, and a bore 212 extends through the key 200 and the boss 208. The bore 212 of the key is coaxially aligned with the bore 204 of the wheel so that a fastener such as a bolt (not shown) can be passed though the bores 204, 212 to secure the key to the wheel. However, it has been found that when this arrangement is used, the wheel is prone to fail in the bore 204 due to the excessive load from a bolt against the bore, in the direction of arrow 214, for example. Another shortcoming is the propensity for the bolt to lose preload. It would therefore be desirable to provide a beam key and a beam key and wheel configuration that allows for the use of a fastener angled with respect to the axis of rotation of a wheel while minimizing or eliminating the structural problems that can lead to wheel and/or fastener failure.

SUMMARY OF THE INVENTION

This problem and others are addressed by the present invention which comprises, in a first aspect a beam key including a body having first and second longitudinally spaced ends, an upper side, and a lower side. The lower side has a first surface not parallel to the upper surface. The beam key also includes a bore having a first end opening in the first surface and a second end opening is formed such that a distance from a center of one of the first and second end openings to the body first end is less than a distance from a center of the other of the first and second end openings to the body first end.

An additional aspect of the invention comprises an aircraft beam key installation arrangement that includes a wheel and beam keys mounted on the wheel. The beam keys have a body having first and second longitudinally spaced ends, an upper side, and a lower side. The lower side includes a first surface and a bore in the first surface has a first end opening in the first surface and a second end opening. The wheel includes a centerline, an opening for receiving the body first end, a second surface angled with respect to the centerline, and a wheel bore coaxially aligned with the beam key bore when the body first end is received in the wheel opening, the wheel bore having a first end opening in the second surface.

BRIEF DESCRIPTION OF THE DRAWINGS

These aspects and features of the invention and others will be better understood after a reading of the following detailed description of the invention together with the following drawings wherein:

FIG. 2 is a top plan view of the beam key of FIG. 1;

FIG. 3 is a bottom plan view of the beam key of FIG. 1;

DETAILED DESCRIPTION

Figure 1:
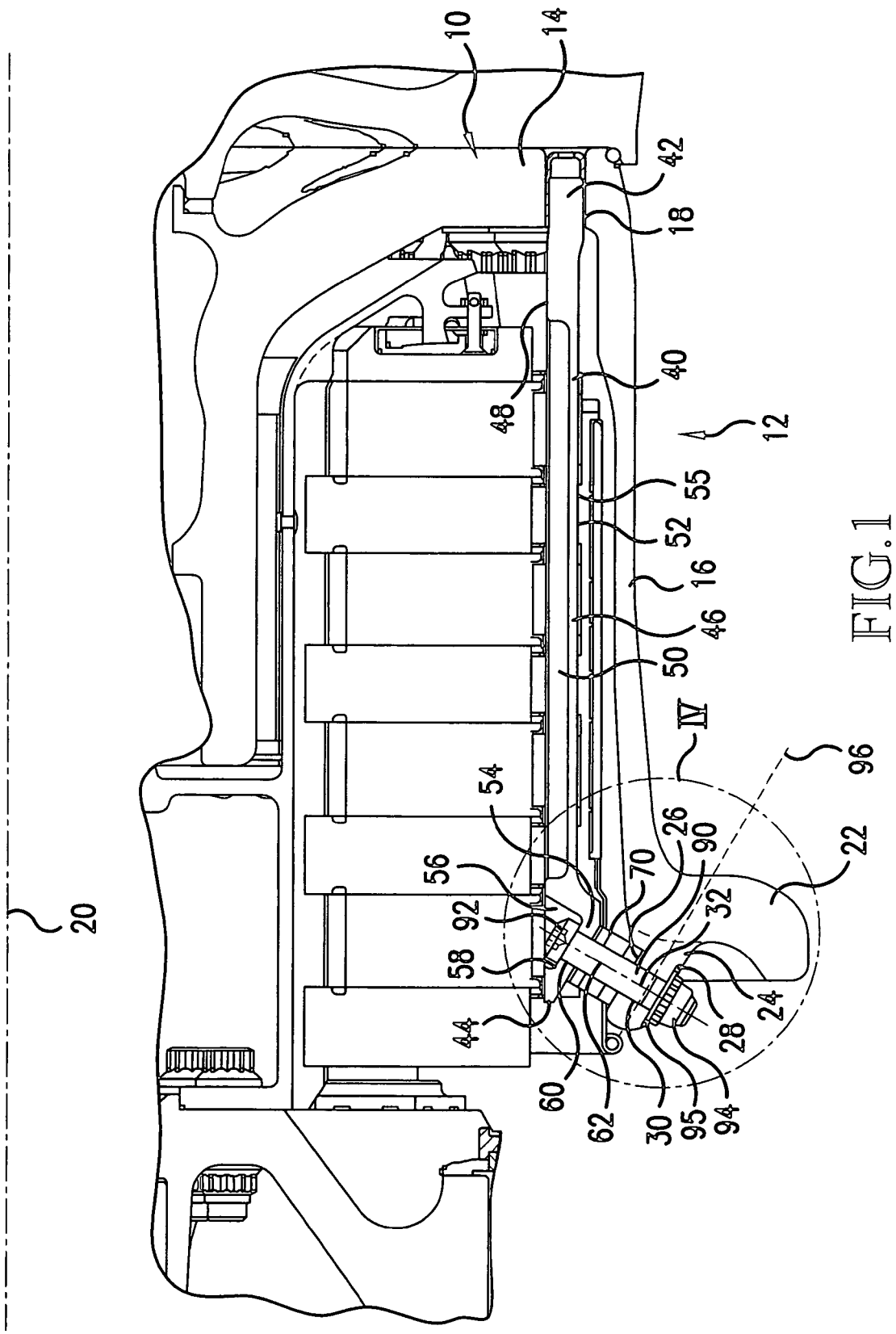
FIG. 1 is a side elevational view of a beam key and a spacer mounted on an aircraft wheel with the beam key supporting a plurality of rotors.
Figure 4:
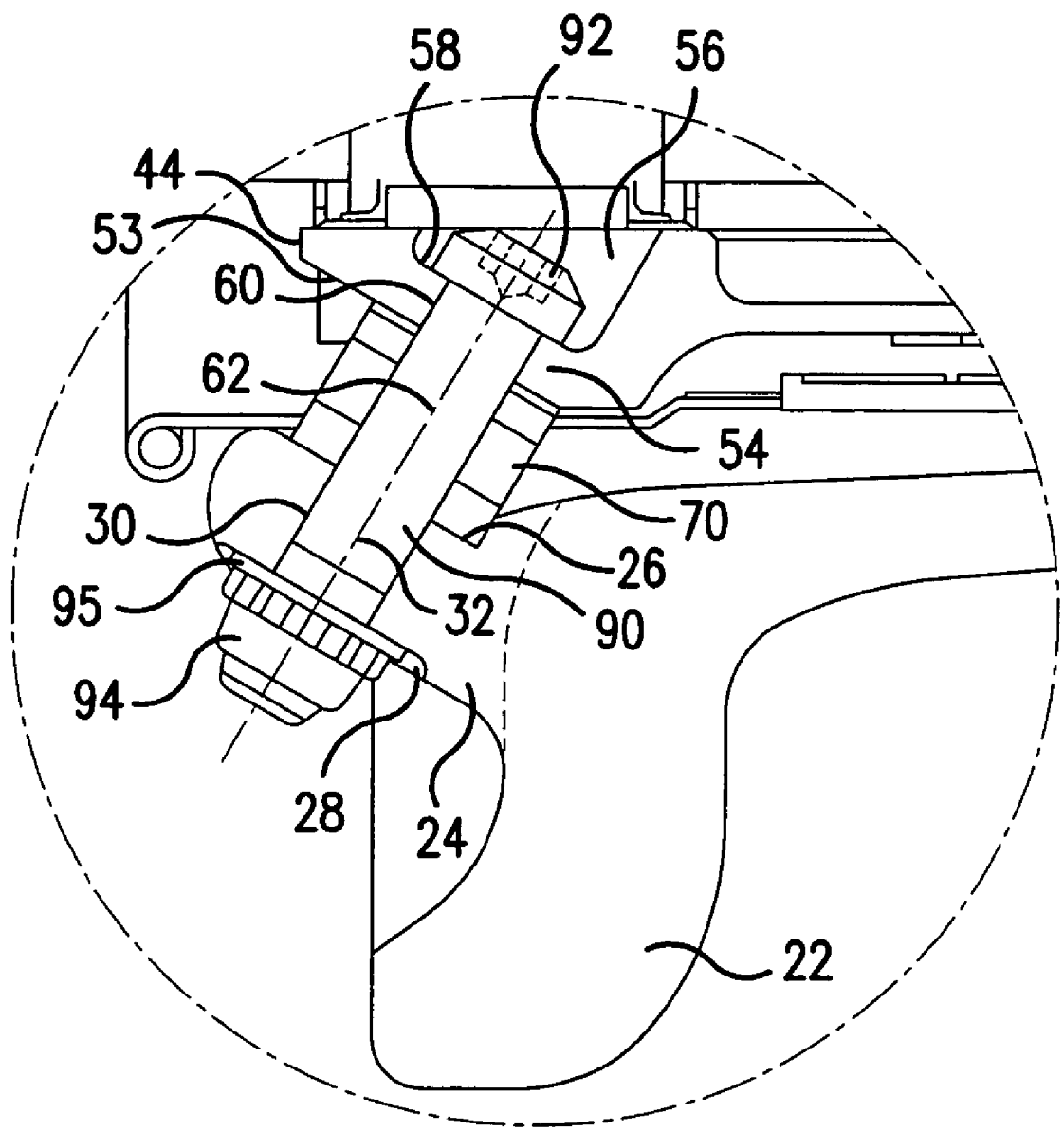
FIG. 4 is a detail view of circle IV in FIG. 1.

Referring now to the drawings, wherein the showings are for the purpose of illustrating presently preferred embodiments of the invention only, and not for the purpose of limiting same, FIG. 1 shows a wheel assembly 10 that includes a wheel 12 having a tie bolt flange 14 and a tubewell 16 projecting therefrom; an opening 18 is provided in inner wall for receiving a portion of a wheel key to be described hereafter. The wheel is rotatable about an axis of rotation 20. A rim 22 projects away from the axis of rotation 20 at the end of cylindrical wall distal from inner end wall 14 and includes a mounting boss 24 projecting at an angle to cylindrical wall 16. Mounting boss 24 includes an inner surface 26, an outer surface 28 and a bore 30 having a centerline 32 which bore extends between inner surface 26 and outer surface 28.

Illustrated in FIGS. 1-4, is a beam key 40 having a first end or tang end 42 sized to fit within opening 18 in inner wheel wall 14 and a second end 44 longitudinally spaced from first end 42 including a boss 99. The body 46 of key 40 has a top side 48 which may include one or more openings or depressions 50 and a bottom side 52 that includes a first portion 54 including a surface 53 angled with respect to top side 48 and a second portion 55 generally parallel to top side 48. Top side 48 includes a recess or counterbore 56 that includes a reaction surface 58. A bore 60 having a centerline 62 extends through key 40 and has a first opening 64 in reaction surface 58 and a second opening 66 in first portion 54 of bottom side 52. Bore 60 is angled with respect to the top side 48 such that the center of first opening 64 is closer to first end 42 than the center of second opening 66 is to first end 42. The second end 44 of key 40 in the region of bore 60 is illustrated in greater detail in FIG. 4. The contact area between the spacer and the wheel is smaller than the cross sectional area of the spacer taken perpendicular to the spacer bore. Also, the contact area between the spacer and the beam key is smaller than the cross sectional area of the spacer taken perpendicular to the spacer bore.

Figure 5:
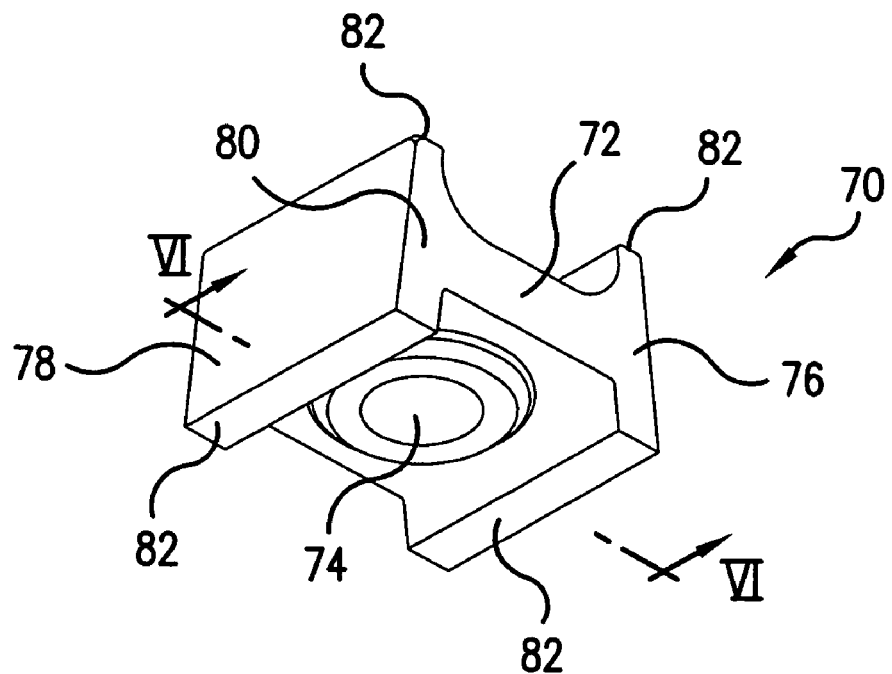
FIG. 5 is a perspective view of the spacer of FIG. 1.
Figure 6:
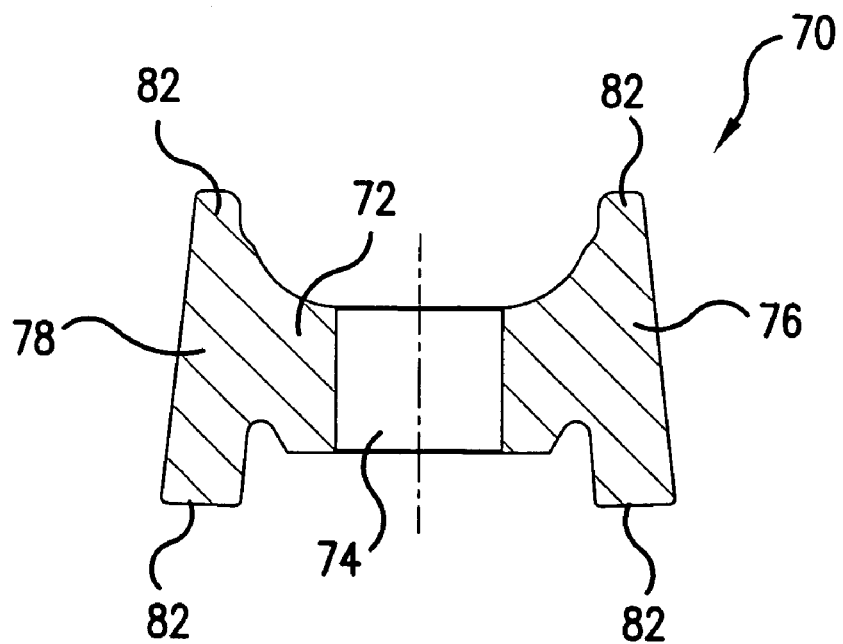
FIG. 6 is a sectional end elevational view of the spacer of FIG. 5 taken along line VI-VI of FIG. 5.

Spacer 70 is also visible in FIG. 1 and illustrated in greater detail in FIGS. 5 and 6. Spacer 70 includes a body portion 72 having a bore 74 and first and second side portions 76, 78 having center portions 80 connected to opposite ends of body portion 72 such that two pairs of legs 82 project in opposite directions on each side of body portion 72 and give the spacer 72 a generally H-shaped cross section. In the disclosed embodiment, the first and second side portions 76 and 78 are not parallel. Spacer 70 is generally formed of a material having a low thermal conductivity. By keeping the contact areas between spacer 70 and the wheel 12 and key 40 small, heat transfer from the rotors to the wheel 12 can be kept at a suitably low level. Suitable materials for spacer 70 include 17-4PH stainless steel and various titanium alloys.

To attach beam key 40 to wheel 12, tang 42 of the beam key 40 is inserted in opening 18 in inner wheel wall. When the beam key 40 is inserted in this manner, first portion 54 of bottom side 52 of the beam key will be spaced from inner surface 26 of mounting boss 24 with bore 60 of key 40 aligned with bore 30 of mounting boss 24. Spacer 70 is then inserted between the first portion 54 of the beam key and the mounting boss 24 with bore 74 of the spacer aligned with the beam key bore 60 and the mounting boss bore 30. A fastener 90 having a head 92 is inserted through bore 60 of key 40 until head 92 contacts reaction surface 58 of the beam key 40, and a nut 94 and washer 95 are used to secure the beam key to the wheel.

As will be appreciated from FIG. 1 in particular, the use of spacer 70 allows beam key 40 to function with its present shape. That is, if the beam key 40 and spacer 70 were formed as a unit, spacer 70 would impact wheel boss 24 during the insertion process and prevent the beam key from moving axially into opening 18.

Figure 9:
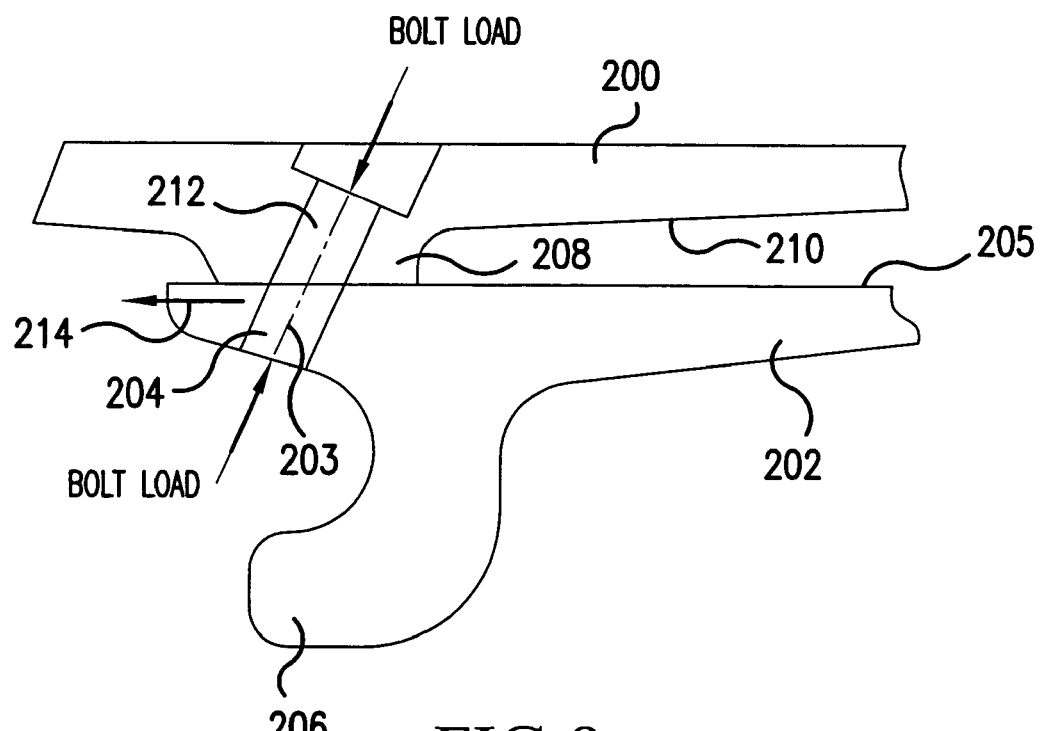
FIG. 9 schematically illustrates a conventional beam key and wheel arrangement.

A comparison of the conventional arrangement of FIG. 9 and the embodiment of the invention illustrated in FIG. 1 reveals that when the fastener 90 of the present embodiment is tightened, first portion 54 of beam key bottom side 52 is moved directly toward inner surface 26 of wheel mounting boss 24. First portion 54 is parallel to inner surface 26, and therefore the tightening of fastener 90 draws the beam key 40 toward the mounting boss 24 without developing a force component in the bore 30 that is not parallel to the axes 32, 62 of bores 30, 74. Such a force component in the conventional design is illustrated by arrow 214 of FIG. 9. While it is presently preferred that first portion 54 be parallel to inner surface 26, this is not always necessary. In some cases, it may be useful to compensate for non-parallel surfaces by using a spacer having non-parallel upper and lower surfaces. The failure problems that have occurred with conventional beam key mounting arrangements will be substantially avoided using an embodiment of the present invention and a beam key can be provided that is shorter and lighter weight than beam keys that do not use angled bolts. In addition, because the contact areas between spacer 70 and the beam key 40 are reduced (as compared to an integral design) less heat is transferred from the beam key (which is subjected to high temperatures during braking) to the wheel.

A consideration for aircraft wheel design is how the wheel will function in the event of a tire failure when the wheel itself must support a significant portion of the weight of an aircraft in what is sometimes referred to as a "roll-on-rim" condition. During roll-on-rim, significant hoop stresses may occur in the wheel rim. The individual key attach bosses create a geometrical stress concentration which magnifies the nominal hoop stress. However, because the mounting boss 24 is located close to the neutral axis 96 of the wheel, as illustrated in FIG. 1, stress levels are kept at an acceptably low level.

Figure 7:
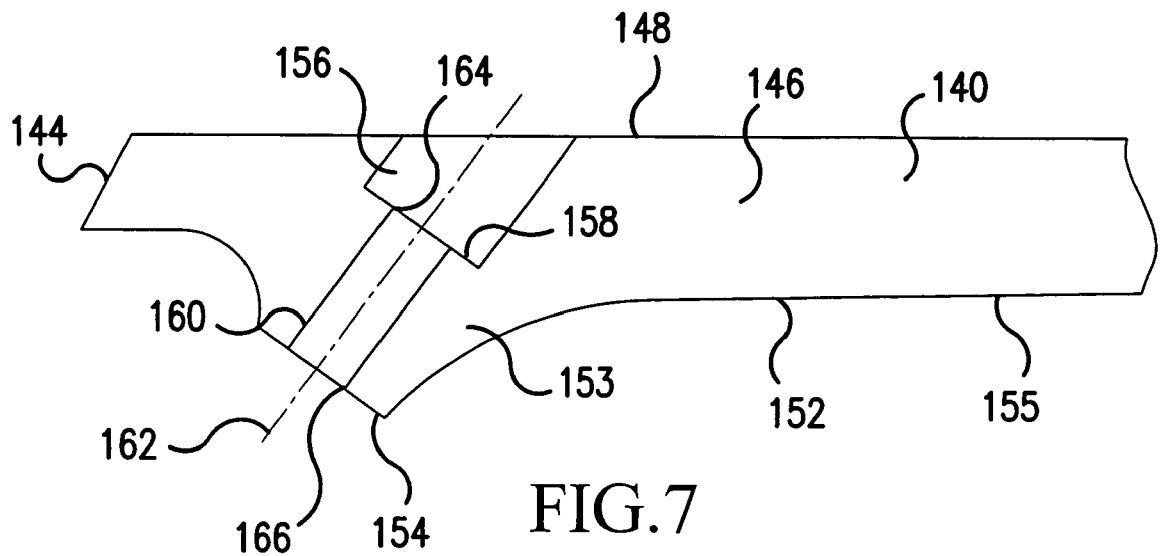
FIG. 7 is a side elevational view of a beam key according to a second embodiment of the invention.

A second embodiment of the invention is illustrated in FIG. 7. In this embodiment, a key 140 is provided having a first end (not shown) and a second end 144 longitudinally spaced from the first end. The body 146 of key 140 has a top side 148 and a bottom side 152 that includes a boss 153 having a first portion 154 angled with respect to top side 148. Bottom side 152 also includes a second portion 155 generally parallel to top side 148. Top side 148 includes a counterbore 156 that includes a reaction surface 158. A bore 160 having a centerline 162 extends through key 140 and has a first opening 164 in reaction surface 158 and a second opening 166 in first portion 154 of boss 153. Bore 160 is angled with respect to the top side 148 such that the center of second opening 166 is closer to second end 144 than the center of first opening 164 is to second end 144. Key 140 is installed in a wheel 12 using a spacer 70 in a manner similar to key 40 of the first embodiment. Key 140 permits the use of a shorter spacer 70 than the first embodiment, which may sometimes be desirable. When it is desired to minimize the thickness of the key, however, the first embodiment would generally be preferred.

Figure 8:
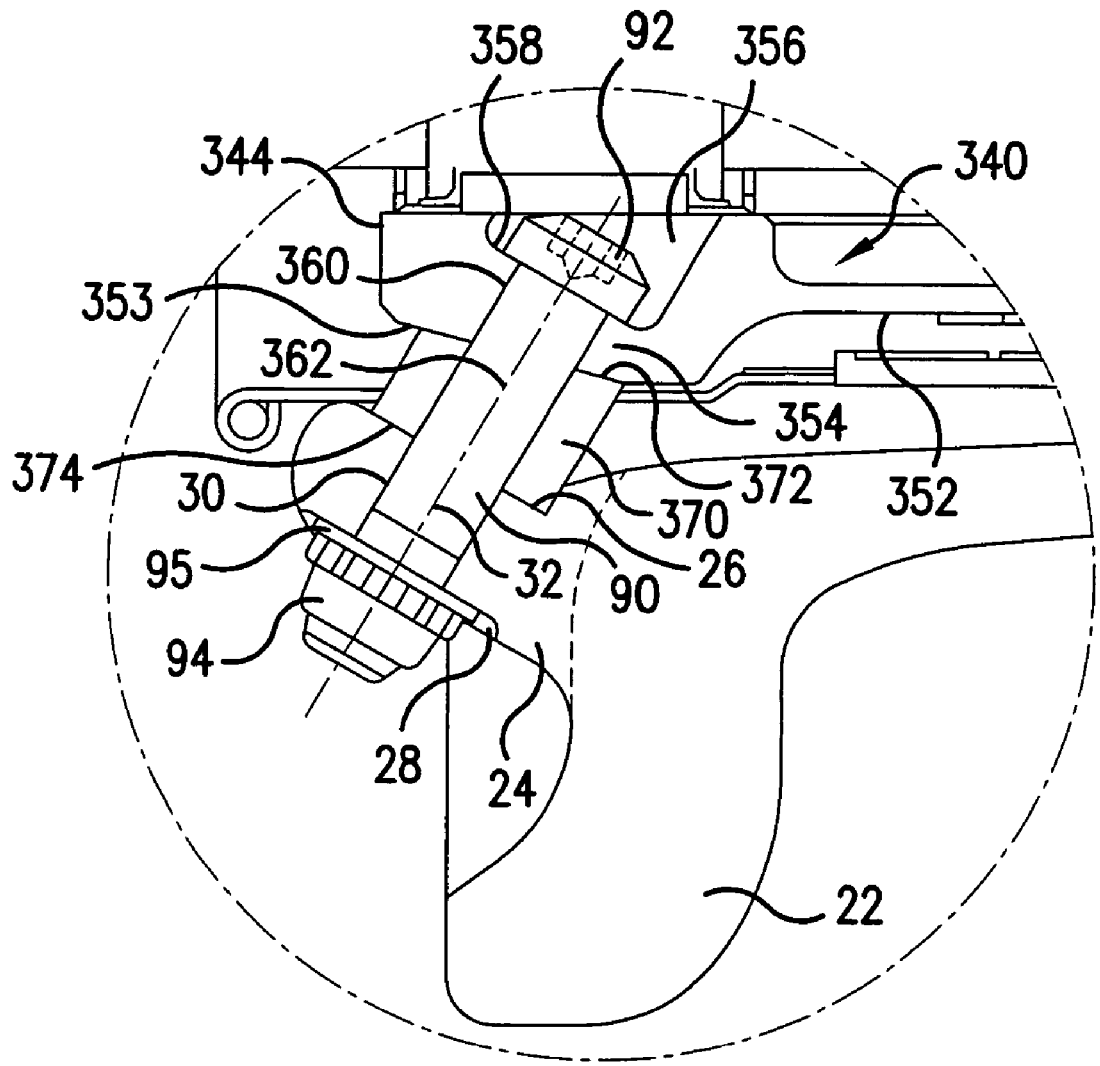
FIG. 8 is a side elevation view of a beam key and spacer arrangement according to a third embodiment of the invention.

A third embodiment of the invention is illustrated in FIG. 8. In this embodiment, a beam key 340 has a second end 344 longitudinally spaced from a first end (not shown). The body of key 340 has a bottom side 352 that includes a first portion 354 including a surface 353. The top side of the beam key includes a counterbore 356 that includes a reaction surface 358. A bore 360 having a centerline 362 extends through key 340.

A spacer 370 used in this embodiment has a first side 372 adapted to contact surface 353 of key 340 and a second side 374 adapted to contact inner surface 26 of mounting boss 24 on rim 22. In this embodiment, the first side 372 lies in a first plane and the second side 374 lies in a second plane that is not parallel to the first plane. However, the angle between the first plane and the second plane is selected to be substantially the same as the angle between surface 353 of key 340 and inner surface 26 of mounting boss 24 as illustrated in FIG. 8 to help "wedge" spacer 370 in place between the key and the wheel when bolt 92 is secured by nut 94.

The present invention has been described herein in terms of several embodiments. Additions and modifications to these embodiments will become apparent to those skilled in the relevant arts upon a reading of the foregoing description. All such obvious modifications and additions are intended to be included within the present invention to the extent they fall within the scope of the several claims appended hereto.

We claim:

1. A beam key comprising:
  a body having first and second longitudinally spaced ends, a longitudinal axis between said first and second ends, an upper side, and a lower side comprising a first surface not parallel to said upper side;
  a bore having a first end opening in said first surface, a second end opening, and a centerline, the centerline of said bore extending at an acute angle to said body longitudinal axis, wherein the lower side includes a boss, a surface of the boss surrounding the bore is substantially perpendicular to a centerline axis of the bore in side view and said second end opening is surrounded by an annular reaction surface between said upper side and said lower side and adapted to engage a head of a fastener extending through said bore.

2. The beam key of claim 1 wherein the centerline of said bore is perpendicular to said first surface.

3. The beam key of claim 2 wherein said lower side includes a first portion comprising said first surface and a second portion generally parallel to said upper side.

4. The beam key of claim 1 wherein said first surface comprises the surface of said boss.

5. The beam key of claim 1 wherein said reaction surface is parallel to said first surface.

6. An aircraft wheel assembly comprising a wheel;
a beam key mounted on said wheel wherein:
said beam key comprises:
  a body having first and second longitudinally spaced ends, an upper side, and a lower side comprising a first surface;
  a bore having a first end opening in said first surface and a second end opening, the lower side including a boss and a surface of the boss surrounding the bore being substantially perpendicular to a centerline axis of the bore in side view;
said wheel comprises:
  a centerline;
  an opening for receiving said body first end;
  a second surface angled with respect to said centerline; and
  a wheel bore coaxially aligned with said beam key bore when said body first end is received in said opening, said wheel bore having a first end opening in said second surface; and
a spacer between said beam key first surface and said wheel second surface, wherein said second end opening is surrounded by an annular reaction surface between said upper side and said lower side and adapted to engage a head of a fastener extending through said bore, said spacer includes a bore aligned with said beam key bore and said wheel bore, said reaction surface is parallel to said wheel second surface when said beam key is mounted on said wheel and a fastener extending through said beam key bore, said spacer bore and said wheel bore securing said beam key to said wheel.

7. The wheel assembly of claim 6 wherein said beam key first surface is angled with respect to said wheel centerline when said beam key is mounted on said wheel.

8. The wheel assembly of claim 6 wherein said wheel second surface is parallel to said beam key first surface when said beam key is mounted on said wheel.

9. The wheel assembly of claim 6 wherein said spacer has a generally H-shaped cross section.

10. The wheel assembly of claim 6 wherein a contact area between said spacer and said wheel is smaller than a cross sectional area of said spacer taken perpendicular to said spacer bore.

11. The wheel assembly of claim 10 wherein a contact area between said spacer and said beam key is smaller than a cross sectional area of said spacer taken perpendicular to said spacer bore.

12. The wheel assembly of claim 6 wherein a contact area between said spacer and said beam key is smaller than a cross sectional area of said spacer taken perpendicular to said spacer bore.

13. The wheel assembly of claim 6 wherein said spacer comprises a material including a stainless steel or a titanium alloy.

14. The wheel assembly of claim 6 wherein said wheel includes a rim having a neutral axis and said wheel boss is near said neutral axis.

15. The wheel assembly of claim 6 wherein said spacer has a first side lying substantially in a first plane and adapted to engage said beam key body first surface and a second side lying substantially in a second plane and adapted to engage said wheel, wherein an angle between said first plane and said second plane is substantially equal to an angle between said beam key body first surface and said second surface of said wheel.

* * * * *